J. T. HENDERSON.
Cultivator.
No. 161,882.
2 Sheets--Sheet 1.
Patented April 13, 1875.
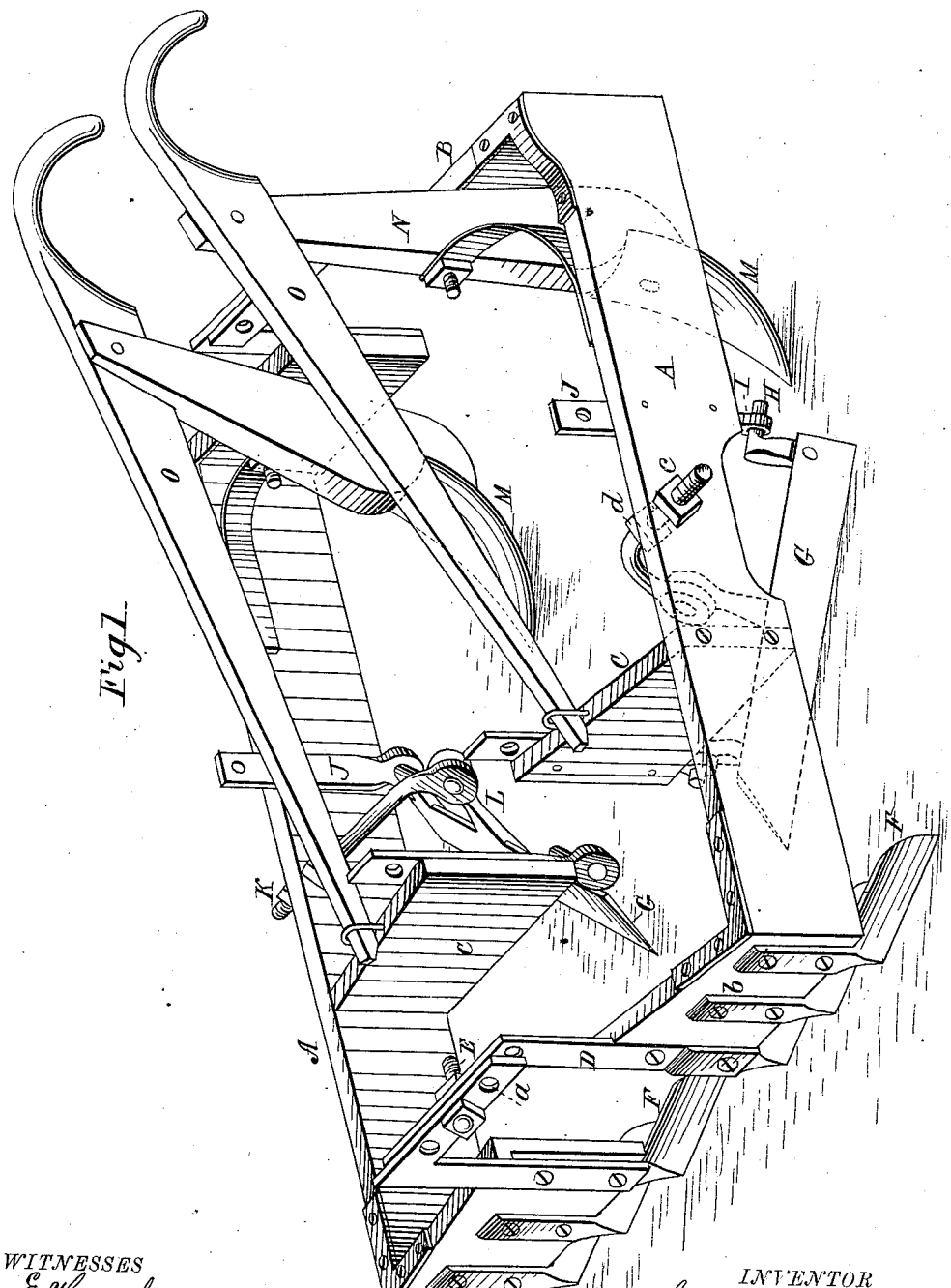
WITNESSES
Jas. E. Hutchinson
Jno. L. Coombs
INVENTOR
James T. Henderson
By James L. Norris,
Attorney

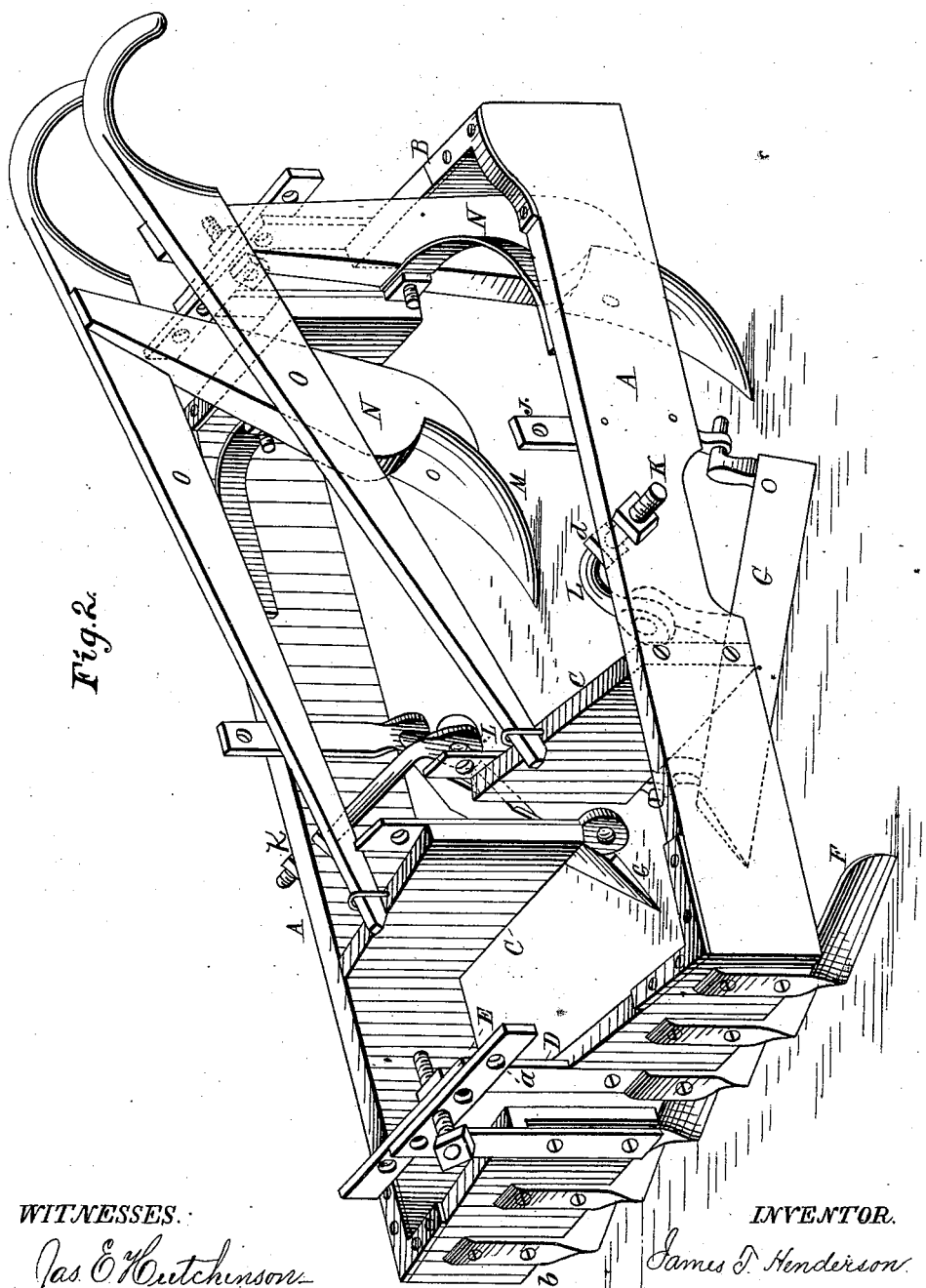

UNITED STATES PATENT OFFICE.

JAMES T. HENDERSON, OF WOODBURY, TENNESSEE.

IMPROVEMENT IN CULTIVATORS.

Specification forming part of Letters Patent No. 161,882, dated April 13, 1875; application filed March 19, 1875.

*To all whom it may concern:*

Be it known that I, JAMES T. HENDERSON, of Woodbury, in the county of Cannon and State of Tennessee, have invented certain new and useful Improvements in Cultivators, of which the following is a specification:

The object of the present invention is to provide a combined cultivator for cotton and other crops, embodying means for pulverizing the ground, scraping off grass or weeds, and hilling or throwing up earth to the plants being cultivated.

The invention consists in the combination in a cultivator of a series of teeth or cutters for cutting up clods and pulverizing the earth; a pair of scrapers for removing weeds, grass, &c., at the sides of a row of plants; and a pair of hilling or other plows located in rear of the scrapers, for loosening the earth and throwing the same toward the plants. The invention also consists in the provision of scraper-blades, which are capable of receiving an angular and vertical adjustment through the medium of pivoted and hinged shanks, and a horizontal adjusting-screw passing through the side beam of the frame.

In the accompanying drawings, Figure 1 is a perspective view of a combined cultivator, showing the frame-sections spread apart. Fig. 2 is a similar view, representing the frame-sections close together.

The longitudinal side beams A A, the short front and rear transverse beams or bars B B, and the middle bars C C comprise the frame of the cultivator, which is thus divided into two longitudinal sections. The sections of the frame are connected at the front and rear by inverted L-shaped plates D D, the vertical arms of which are attached to the transverse frames or bars, and the top horizontal arms of which are provided with holes *a*. A bolt, E, passing through each perforated plate serves to connect the frame-sections in such a manner that the same are free to move upon said bolts, so as to adjust themselves to the varying width of the row or hill of plants under cultivation. The series of holes in the connecting-plates also permit the frame-sections to be adjusted laterally to or from each other. To the front transverse bars of the frame-sections are attached a series of cutters or drag-teeth, F, said teeth extending diagonally in rearward direction, and being secured by means of vertical shanks *b*, bolted to the front sides of the beams B. The cutters or teeth serve to break up clods, and to pulverize the earth at the sides of the plants or crop. In rear of the pulverizing-teeth two scraper-blades, G G, are located, said scrapers being designed for scraping or bearing-off the hill, and for removing all weeds or grass growing in the vicinity of the crop. The scraper-blades are set at different angles in respect to each other, and they are provided with gudgeons or pins H at their ends, which turn in bearings or eyes I, made at the lower ends of vertical standards or bars J, attached to the inner sides of the longitudinal beams of the frame and the rear sides of the short middle beams. A screw, K, passing horizontally through each side beam of the frame has its shank portion bent downward, and jointed or pivoted to an arm, L, rising from the central portion of each scraper-blade. By adjusting the screw through the medium of nuts *c d*, applied on opposite sides of the beams, the scrapers can be set at various angles in respect to the ground, so as to conform in position with the inclination of the hill upon which the plants are growing. The standards or bars J are also made adjustable in a vertical direction by providing the same with a series of holes.

The scrapers are followed by a pair of plows or shovels, M M, which are attached to vertical braced standards N N, having the guide-handles attached to their upper ends.

The plows or shovels may be of any preferred form; but generally they are shaped to loosen the earth, and to hill the plants by throwing the earth toward the same.

In certain instances I propose to change the position of the cultivating devices, and to locate the pulverizing-teeth at the rear end of the frame.

Having thus described my invention, what I claim as new, and desire to secure by Letters Patent, is—

1. The combination, in a cultivator composed of two flexibly-connected sections, of a series of pulverizing-teeth, F, a pair of scrapers, G, and a pair of hilling-plows or cultivator-shovels, M, substantially as and for the purpose set forth.

2. The pivoted or adjustable scrapers G, hinged to the standards J, in combination with the adjusting-screw K, hinged to the arm L, substantially as and for the purpose described.

In testimony that I claim the foregoing I have hereunto set my hand.

JAS. T. HENDERSON.

Witnesses:
 JAMES L. NORRIS,
 GEO. W. CUSHING, Jr.